(12) United States Patent
Lim et al.

(10) Patent No.: US 7,502,377 B2
(45) Date of Patent: Mar. 10, 2009

(54) PCI TO PCI EXPRESS PROTOCOL CONVERSION

(75) Inventors: Su Wei Lim, Klang (MY); Chai Huat Gan, Bukit Mertajam (MY); Darren L. Abramson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 10/976,682

(22) Filed: Oct. 29, 2004

(65) Prior Publication Data

US 2006/0095607 A1    May 4, 2006

(51) Int. Cl.
*H04L 12/28* (2006.01)
*H04J 3/16* (2006.01)

(52) U.S. Cl. ...................... 370/412; 370/466
(58) Field of Classification Search ................ 370/412, 370/466
See application file for complete search history.

(56) References Cited

U.S. PATENT DOCUMENTS

| | | | |
|---|---|---|---|
| 6,009,488 A | | 12/1999 | Kavipurapu |
| 7,313,643 B2 * | | 12/2007 | Sakurai et al. ............. 710/315 |
| 7,356,636 B2 * | | 4/2008 | Torudbakken et al. ....... 710/313 |
| 2003/0026280 A1 * | 2/2003 | Mansouri et al. ............ 370/429 |
| 2005/0041450 A1 * | 2/2005 | Duh et al. ..................... 365/1 |
| 2005/0060470 A1 * | 3/2005 | Main et al. ................... 710/305 |
| 2005/0182887 A1 * | 8/2005 | Sakurai et al. .............. 710/315 |
| 2005/0262269 A1 * | 11/2005 | Pike ............................... 710/1 |
| 2006/0026320 A1 * | 2/2006 | Shih et al. ................... 710/104 |
| 2006/0085573 A1 * | 4/2006 | Pike et al. ..................... 710/36 |
| 2006/0092928 A1 * | 5/2006 | Pike et al. ................... 370/355 |
| 2006/0095609 A1 * | 5/2006 | Radhakrishnan et al. ...... 710/52 |
| 2006/0209735 A1 * | 9/2006 | Evoy .......................... 370/315 |

* cited by examiner

*Primary Examiner*—Andrew Lee
(74) *Attorney, Agent, or Firm*—Blakely, Sokoloff, Taylor & Zafman LLP (57) ABSTRACT

In embodiments of the present invention, a PCI bus to PCE Express protocol conversion module includes a process implemented by control logic to convert streaming PCI information to PCI Express packets. In one embodiment, an agent may transfer PCI data and associated byte enables to a first queue, which may temporarily store the PCI data and associated byte enables in a quad word format. A decoder may determine whether the PCI byte enables are combinable, contiguous, and/or active, and, using state machines, transfer a quantity of the PCI data and associated byte enables from the first queue to a second larger queue. The state machines may break the PCI stream to arrive at the quantity of PCI data being transferred. The second queue may have at least one location to temporarily store the quantity of data and byte enables in at least one packet having a PCI express format.

27 Claims, 7 Drawing Sheets

PCI TO PCI EXPRESS PROTOCOL CONVERSION

BACKGROUND

1. Field

Embodiments of the present invention relate to peripheral component interconnects and, in particular, to peripheral component interconnect (PCI) bus protocol.

2. Discussion of Related Art

A peripheral component interconnect (PCI) local bus is a bus in a computer system that interconnects a microprocessor and peripheral devices, such as keyboards, disk drives, video adapters, etc. A PCI bus has slots into which the adapter cards for the peripheral devices can be inserted or removed. The *PCI Local Bus Specification, Revision* 3.0, Feb. 3, 2004, PCI Special Interest Group, Portland, Oreg., (hereinafter "PCI Specification") provides, among other things, the protocol(s) and configuration specification for PCI Local Bus components and adapter cards. Products designed by different vendors but which are compatible with the PCI Specification also may be compatible with each other.

The *PCI Express™ Base Specification, Revision* 1.0a, Apr. 15, 2000, PCI Special Interest Group, Portland, Oreg., (hereinafter "PCI Express Specification"), along with PCI Special Interest Group (hereinafter "PCI-SIG") Engineering Change Notice (hereinafter "ECN") of Aug. 21, 2003 and the ECN of Jan. 21, 2004, provide for an enhancement of the PCI Specification. As the PCI Express Specification describes, a PCI Express to PCI Bridge provides a connection between a PCI Express fabric and a PCI hierarchy. Traditional PCI Express to PCI Bridges have limitations, however.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figures 1, 2:
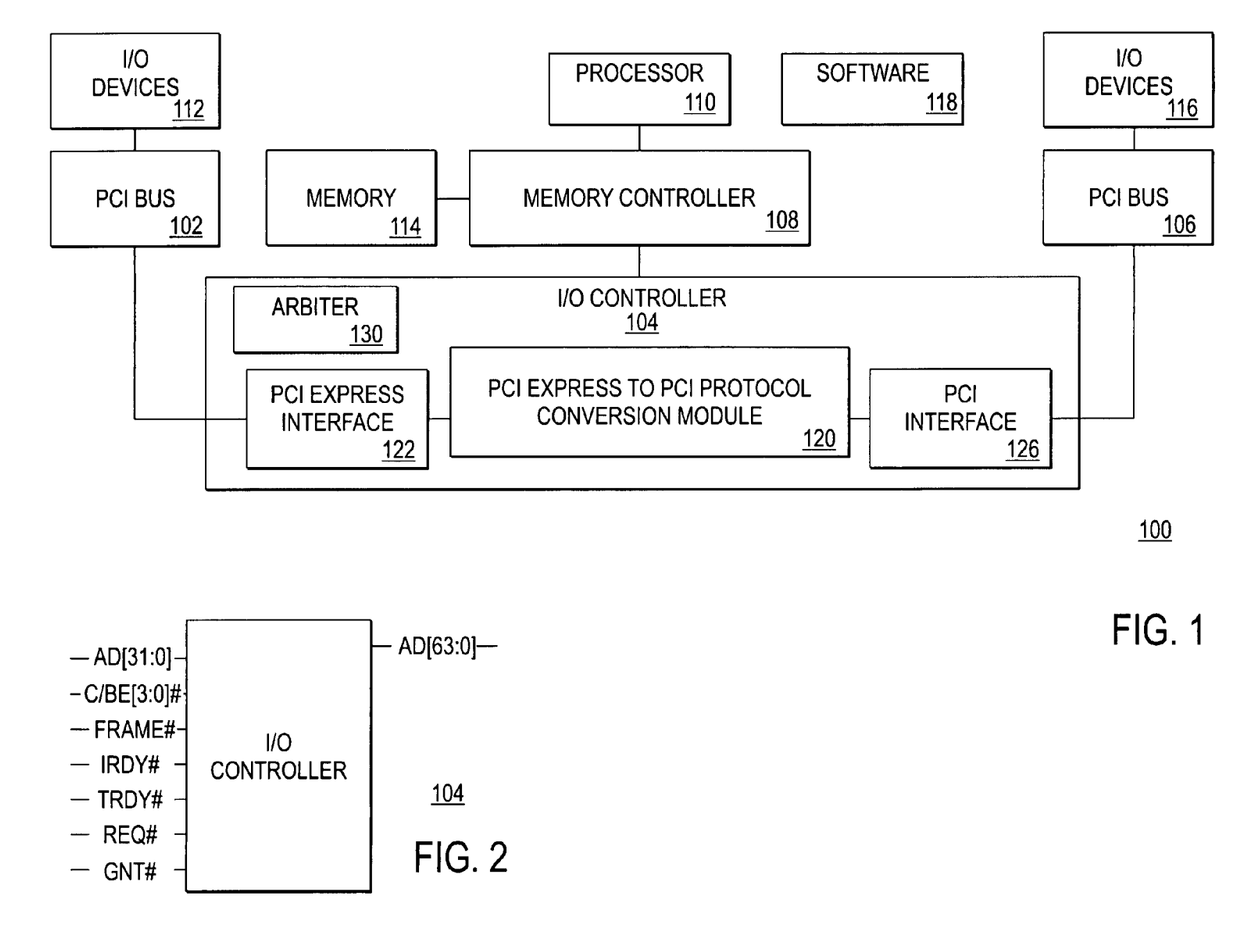
FIG. 1 is a high-level block diagram of a computer system according to an embodiment of the present invention.
FIG. 2 is a diagram of some of the pins on the example I/O controller depicted in FIG. 1 according to an embodiment of the present invention.

FIG. 1 is a high-level block diagram of a computer system 100 according to an embodiment of the present invention. In the illustrated embodiment, the computer system 100 includes a peripheral component interconnect (PCI) Express 102 coupled to an input/output (I/O) controller 104. The example I/O controller 104 is coupled to a PCI bus 106, and a memory controller 108. The example PCI Express 102 is coupled to one or more I/O devices 112, the example memory controller 108 is coupled to a processor 110 and a memory 114, and the example PCI bus 106 is coupled to one or more I/O devices 116. The illustrated computer system 100 also includes software 118.

The illustrated I/O controller 104 includes a PCI Express to PCI protocol conversion module 120 (hereinafter "protocol conversion module 120") coupled between a PCI Express interface 122 and a PCI interface 126, and an arbiter 130.

In embodiments of the present invention, the computer system 100 may comprise a mobile computer system, a desktop computer system, a server computer system, or other suitable computer system.

The example PCI Express 102 may be any suitable PCI Express that includes adapter card slots to interconnect components in a computer system, such as a microprocessor and peripheral devices, for example. The PCI Express 102 may be compatible with the PCI Express Specification, the ECN of Aug. 21, 2003, and/or the ECN of Jan. 21, 2004.

The example I/O controller 104 may provide input/output support for the PCI Express 102, the PCI bus 106, the memory controller 108, as well as other functionalities.

The example PCI bus 106 may be any suitable PCI bus that includes adapter card slots to interconnect components in a computer system, such as a microprocessor and peripheral devices, for example. The example PCI bus 106 may utilize the *PCI Local Bus Specification, Revision* 3.0, Feb. 3, 2004, PCI Special Interest Group, Portland, Oreg., (hereinafter "PCI Specification") protocol to exchange information with components in the system 100. For example, the bus transfer mechanism for the PCI bus 106 may be a burst having a sequence or stream of data transmissions. The burst may include an address phase in which the PCI bus 106 sends a target address to the I/O controller 104, and one or more data phases in which the PCI bus 106 communicates with and/or exchanges information (such as commands, data, etc., for example) with the target.

The example memory controller 108 memory may manage the memory 114 such as control and monitor the status of the memory 114 data lines, error checking, etc., for example.

The example processor 110 may execute programming instructions and may implement embodiments of the present invention, and in embodiments, may be a processor of the Pentium® processor family available from Intel Corporation of Santa Clara, Calif.

The example I/O devices 112 and 116 may be peripheral components or devices, such as local area networks (LANs), small computer system interfaces (SCSI), etc., for example.

The example memory 114 may be any suitable memory that performs the functions of storing data (pixels, frames, audio, video, etc.) and software (control logic, instructions, code, computer programs, etc.) for access by other components. The memory 114 is not limited to any particular type of memory device. In embodiments of the present invention, the memory may be any known read-only memory (ROM), dynamic random access memory (DRAM) such as Rambus® DRAM (RDRAM), synchronous DRAM (SDRAM), extended data out DRAM (EDO DRAM), etc., for example, static RAM (SRAM), flash memory, etc.

The example software 118 may include control logic, instructions, commands, code, computer programs, etc., to be executed by the computer system 100.

The example PCI Express interface 122 may interface the I/O controller 104 with the PCI Express 102. The PCI Express interface 122 may be compatible with the PCI Express Specification, the ECN of Aug. 21, 2003 and/or the ECN of Jan. 21, 2004. In one embodiment, the PCI Express interface 122 implements a packet based protocol to exchange information with components in the computer system 100.

The example PCI interface 126 may interface the I/O controller 104 with the PCI bus 106. The example PCI bus 126 may be compatible with the PCI Specification and may exchange information with other components in the computer system 100 using a streaming format.

The example arbiter 130 may be any suitable hardware, software, and/or firmware that may receive and grant a request from an agent to use the I/O controller 104.

The example conversion module 120 may convert information from a PCI protocol to a PCI Express protocol. The conversion module 120 according to one embodiment of the present invention is described with reference to FIG. 2, which is a diagram of some of the pins on the I/O controller 104, FIG. 3, which is a block diagram of the conversion module 120 according to an embodiment of the present invention, FIGS. 4A and 4B, which are flowcharts illustrating a process 400 for operating the conversion module 120 according to an embodiment of the present invention, and FIGS. 5-8, which illustrate PCI Express packets created using the conversion module 120 according to an embodiment of the present invention.

Referring now to FIG. 2, the example I/O controller 104 includes a REQ# pin to receive a request from an agent to use the I/O controller 104, one or more GNT# pins to send a signal to grant a request from an agent to use the I/O controller 104, one or more FRAME# pins to receive a signal to indicate the beginning and duration of an access, one or more initiator ready (IRDY#) pins to receive IRDY# signal to indicate that the initiating agent is ready to exchange data, and one or more target ready (TRDY#) pins to receive a TRDY# signal to indicate on which particular clock data is to transfer.

The example I/O controller 104 may include multiplexed address and data bus AD [31::0] pins to receive addresses and data. During an address phase the signals on the AD [31::0] pins are interpreted as addresses and during one or more data phases the signals on the AD [31::0] pins are interpreted as data. In alternative embodiments, the I/O controller 104 may include multiplexed address and data bus (AD [63::0] pins to receive addresses and data.

The example I/O controller 104 also includes a multiplexed command/byte enable (C/BE) pin to receive a signal indicating a command or byte enables. During an address phase the signals on the C/BE pins are interpreted as bus commands and during one or more data phases the signals on the C/BE pins are interpreted as byte enables.

Figure 3:
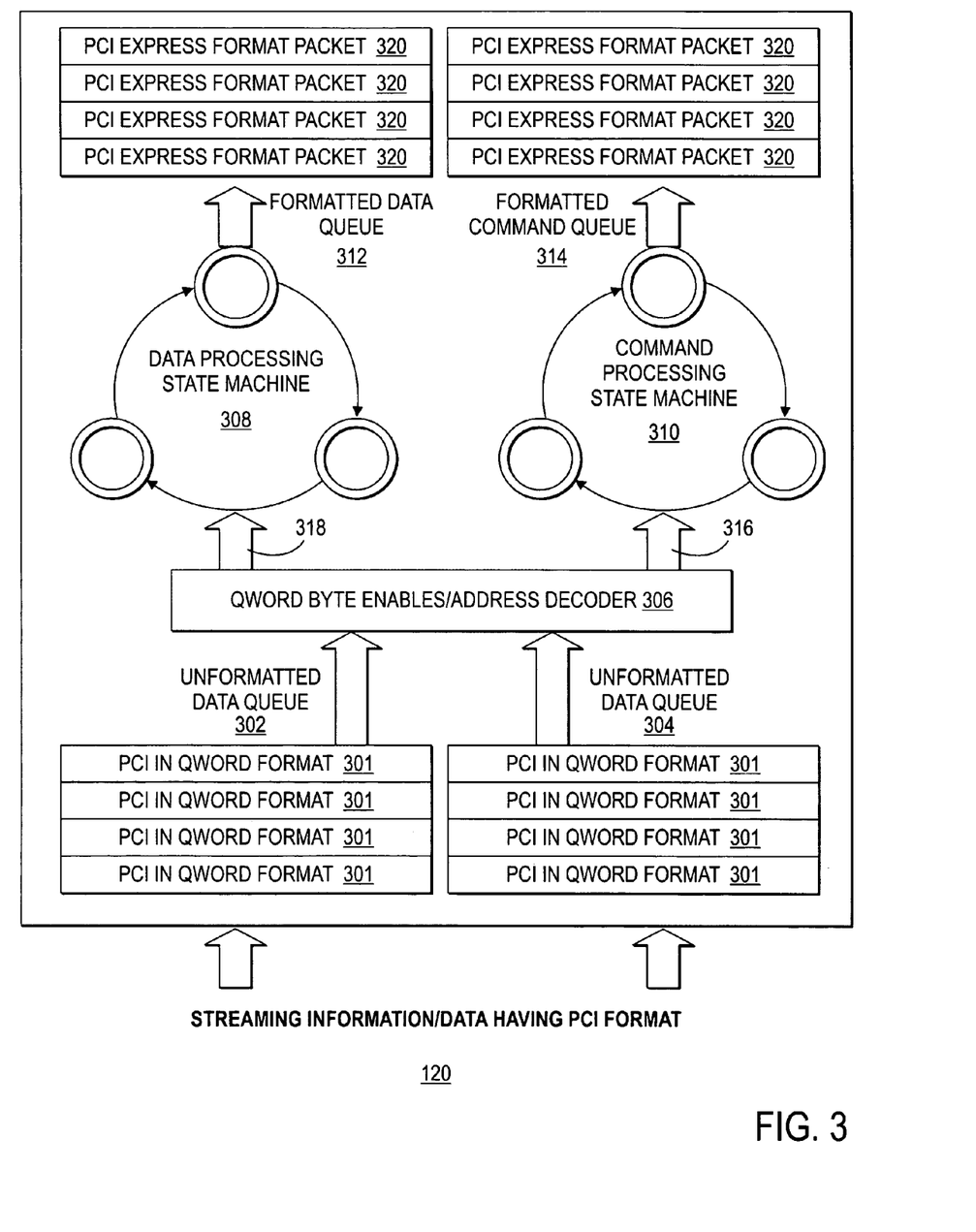
FIG. 3 is a block diagram of the example conversion module depicted in FIG. 1 according to an embodiment of the present invention.

Referring now to FIG. 3, the example conversion module 120 includes an unformatted data queue 302 and an unformatted command queue 304 coupled to a QWORD (quad word or eight bytes)/byte enables/address decoder 306 (hereinafter "decoder 306"). The example decoder 306 is coupled to a data processing state machine 308 and a command processing state machine 310, which are coupled to a formatted data queue 312 and a formatted command queue 314, respectively.

The example unformatted data queue 302 and unformatted command queue 404 may be a relatively small buffers, such as a first-in-first-out (FIFO) buffers, for example, that may receive an information/data stream having a PCI protocol, temporarily store the information 301 in QWORD format, and may forward the temporarily stored information to the decoder 306.

In the illustrated embodiment, the decoder 306 may decode the information to determine starting addresses, word lengths, and byte enables, for example, and may decide whether the decoded information should be associated with the same PCI Express transaction. The decoder 306 also may generate control signals 316 and 318 that indicate the where to break or truncate an information stream to form a boundary for a PCI Express packet.

Figure 4A:
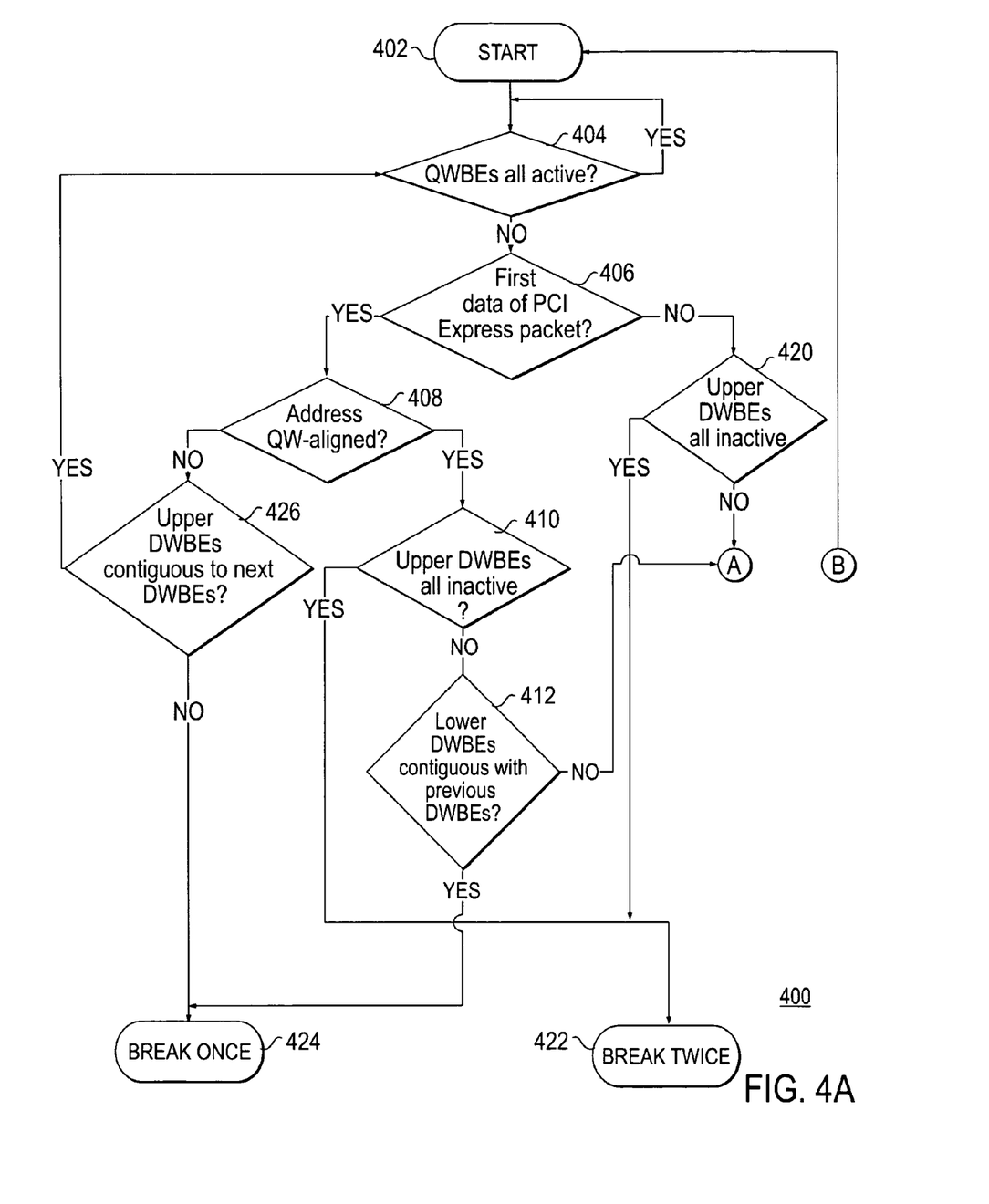
FIGS. 4A and 4B are flowcharts illustrating a process of operating the computer system illustrated in FIG. 1 according to an embodiment of the present invention.
Figure 4B:
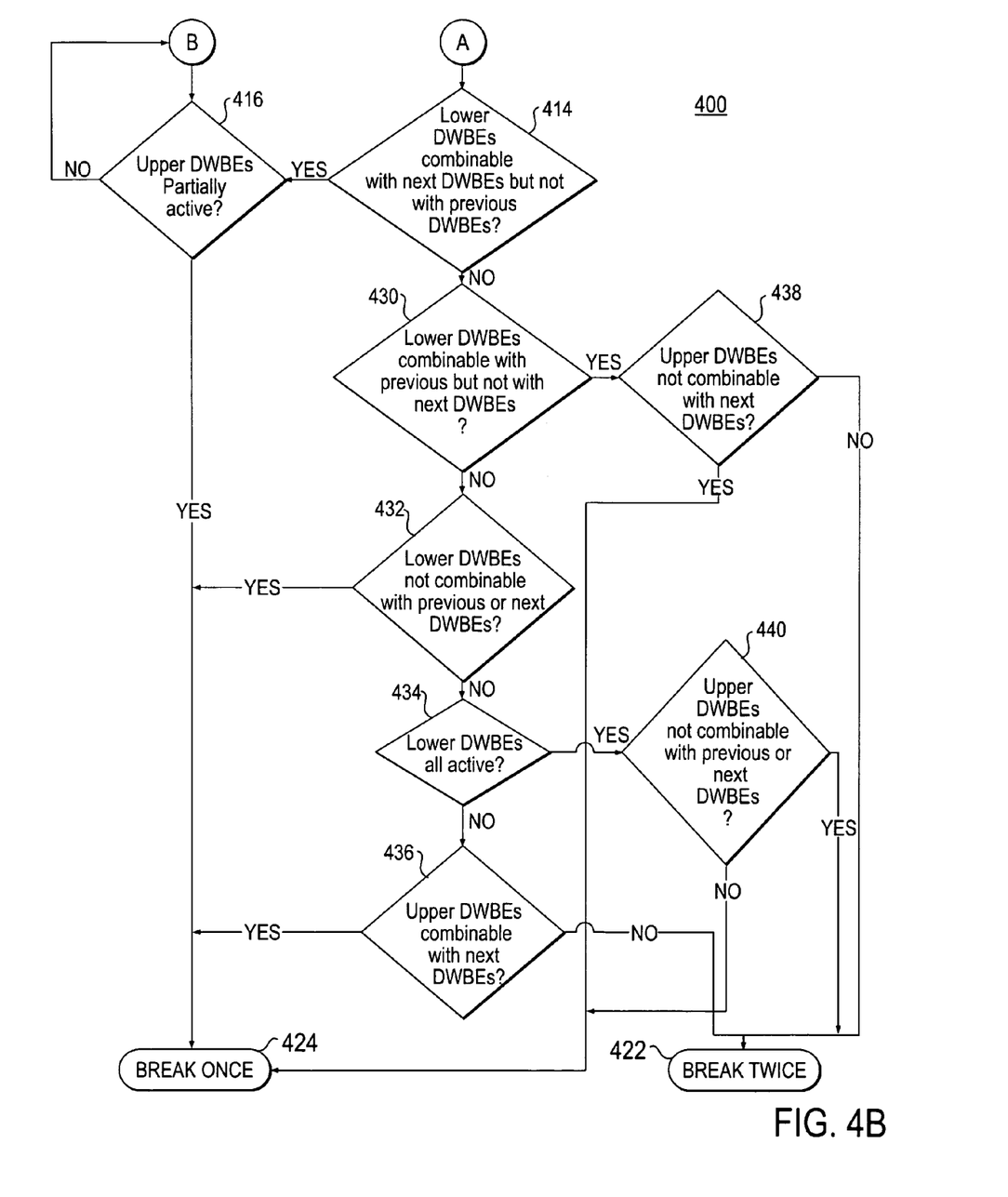

For example, the decoder 306 may implement the process 400 to generate control signals 316 and 318, which may be used to indicate where an information/data stream should be truncated and how it should be reassembled to form one or more packets having a PCI Express format. The decoder 306 may use the control signals 316 and 318 to control the data processing state machine 308 and/or the command processing state machine 310. The decoder 306 may be any suitable hardware, software, firmware, or combination thereof that decodes addresses and/or byte enable signal bit patterns that have been encoded upstream. For example, the decoder 306 may be implemented using combinatorial logic gates and/or finite state machines.

The data processing state machine 308 and the command processing state machine 310 may use the control signals 316 and 318, respectively, to truncate the information 301 to form the one or more packets 320 having a PCI Express format. The data processing state machine 308 and the command processing state machine 310 may forward the packets 320 to the formatted data queue 312 and the formatted command queue 314, respectively.

The example formatted data queue 312 and the formatted command queue 314 may be relatively large buffers, such as FIFO buffers, for example, that may temporarily store packets 320 having a PCI Express format and may forward the PCI Express data packets 320 to the PCI Express interface 122.

FIGS. 4A and 4B will be described with reference to the example information in Table 1, which may be information streaming into the conversion module 120 for a write cycle in a single burst according to an embodiment of the present invention.

TABLE 1

| Address | DWORD Byte Enable (Active Low) | DWORD |
|---|---|---|
| A000 0000 | 0011 | 1111 1111 |
|  | 0000 | 2222 2222 |
|  | 1100 | 3333 3333 |
|  | 1111 | 4444 4444 |
|  | 1100 | 5555 5555 |
|  | 0011 | 6666 6666 |

The example streaming information uses a PCI protocol and includes a start address "A000 0000," six double words (DWORD or four bytes) "1111 1111," "2222 2222," "3333 3333," "4444 4444," "5555 5555," and "6666 6666," and a DWORD byte enable for each DWORD. The DWORD byte enables indicate which bytes in its associated DWORD are valid. For example, the least significant two bits of the byte enable 0011 indicates that the lower two bytes of the DWORD 1111 1111 are not valid because the least significant two bits of the byte enable 0011 are "11" (active low). The most significant two bits of the byte enable 0011 indicates that the upper two bytes of the DWORD 1111 1111 are valid because the most significant two bits of the byte enable 0011 are "00" (active low). In the illustrated embodiment, the address is represented as a hexadecimal number, the DWORD byte enables are represented as four bits, and the DWORD data is represented as a hexadecimal number.

The process 400 starts in a block 402. In one embodiment, an agent (such as an I/O device 116, for example) may assert a REQ# signal on the REQ# pin and the arbiter 130 may assert the GNT# signal on the GNT# pin. One or more clock signals later the granted agent may drive a FRAME# signal on the FRAME# pin, a starting address on the AD [31::0] pins, and a command on the C/BE pins. According to the illustrated embodiment, the I/O device 116 drives A000 0000 on the AD [31::0] pins and a code to indicate that the command is a write to the I/O device 112, etc., for example. On the next clock edge in which the IRDY# and TRDY# are asserted, data is placed on the AD [31::0] pins.

In the illustrated embodiment, the information in Table 1 streams into the unformatted command queue 304 and is temporarily stored there in sixty-four bit wide QWORD format. Table 2 includes an example of the information in Table 1 as it may be temporarily stored in the unformatted command queue 304 according to an embodiment of the present invention.

TABLE 2

| QWORD Byte Enable (Active Low) | QWORD Data [63::0] |
| --- | --- |
| 0000 0011 | 2222 2222 |
|  | 1111 1111 |
| 1111 1100 | 4444 4444 |
|  | 3333 3333 |
| 0011 1100 | 6666 6666 |
|  | 5555 5555 |

In the illustrated embodiment, the PCI protocol streaming information is temporarily stored there as a first QWORD 2222 2222 1111 1111 with a byte enable for the lower DWORD of 0011 (active low) and a byte enable for the upper DWORD of 0000 (active low), a second QWORD 4444 4444 3333 3333 with a byte enable for the lower DWORD of 1100 (active low) and a byte enable for the upper DWORD of 1111 (active low), and a third QWORD 6666 6666 5555 5555 with a byte enable for the lower DWORD of 1100 (active low) and a byte enable for the upper DWORD of 0011 (active low). In the illustrated embodiment, the left-most bit is the most significant bit and the right-most bit is the least significant bit.

In a block 404, the decoder 306 may determine whether the first QWORD byte enables are all active. If the first QWORD byte enables are all active, then the QWORD is temporarily stored in the formatted data queue 312 and the decoder looks at the next QWORD in the unformatted data queue 302. The process 400 performs this loop until the decoder 306 sees a QWORD that has byte enables that are not all active. When the decoder 306 sees a QWORD with byte enables that are not all active, control passes to a block 406. In the illustrated embodiment, the first QWORD byte enables are 0000 and 0011 (active low). Thus, in the example embodiment, the first QWORD byte enables are not all active and control passes to the block 406.

In the block 406, the decoder 306 may determine whether the first QWORD is the first data for a PCI Express packet 320. If it is determined that the first QWORD is the first data for the PCI Express packet, then control passes to a block 408.

In the illustrated embodiment, the first QWORD is the first data for the PCI Express packet 320 and control passes to the block 408.

In the block 408, the decoder 306 may determine whether the address is QWORD aligned. The address is QWORD aligned if the lower three bits of the DWORD address are "000". If the address is QWORD aligned, then control passes to the block 410. In the illustrated embodiment, the lower three bits of the DWORD address are "000" and thus the address is QWORD aligned. Accordingly, control passes to the block 410.

In the block 410, the decoder 306 may determine whether the upper DWORD byte enables for the first QWORD are all inactive. If the upper DWORD byte enables are not all inactive, then control passes to the block 412. In the illustrated embodiment, the upper DWORD byte enables are 0000 (active low). Accordingly, the upper DWORD byte enables for the first QWORD are not all inactive and control passes to the block 412.

In the block 412, the decoder 306 determines whether the lower DWORD byte enables for the first QWORD are contiguous with the previous DWORD byte enables. Non-contiguous byte enables may be byte enables that are separated by non-enabled bytes. The lower DWORD byte enables are contiguous with the previous DWORD byte enables if the least significant byte enable of the lower DWORD byte enables is active and the most significant byte enable of the previous DWORD byte enable is also active. If the lower DWORD byte enables are not contiguous with the previous DWORD byte enables, then control passes to the block 414. In the illustrated embodiment, there is no previous DWORD byte enable. Accordingly, the lower DWORD byte enables are not contiguous with the previous DWORD byte enables and control passes to the block 414.

In the block 414, the decoder 306 may determine whether the lower DWORD byte enables of the first QWORD are combinable with the next DWORD byte enables but not combinable with the previous DWORD byte enables. The lower DWORD byte enables of the first QWORD are combinable with the next DWORD byte enables if the lower DWORD byte enables of the first QWORD and the next DWORD byte enables can be grouped under a single PCI Express transaction. The lower DWORD byte enables of the first QWORD and the next DWORD byte enables can be grouped under a single PCI Express transaction if the most significant byte enable of the lower DWORD byte enables of the first QWORD is active and the least significant byte enable of the next DWORD byte enables is also active.

The lower DWORD byte enables of the first QWORD are combinable with the previous DWORD byte enables if the lower DWORD byte enables of the first QWORD and the previous DWORD byte enables can be grouped under a single PCI Express transaction. The lower DWORD byte enables of the first QWORD and the previous DWORD byte enables can be grouped under a single PCI Express transaction if the least significant byte enable of the lower DWORD byte enables of the first QWORD is active and the most significant byte enable of the previous DWORD byte enables is also active. If the lower DWORD byte enables are combinable with the next DWORD byte enables but not combinable with the previous DWORD byte enables, then control passes to the block 416.

In the illustrated embodiment, the most significant byte of the DWORD byte enables of the first QWORD is 0 (active low) and the least significant byte of the next DWORD byte enable is 0 (active low) and the lower DWORD byte enables of the first QWORD are combinable with the next DWORD byte enables. Also in the illustrated embodiment, there are no previous DWORD byte enables, thus the lower DWORD byte enables of the first QWORD and the previous DWORD byte enables are not combinable. Accordingly, control passes to the block 416.

In the block 416, the decoder 306 may determine whether the upper DWORD byte enables for the first QWORD are partially active. If the upper DW byte enables are not partially active, then control returns to the block 402 and the first QWORD is temporarily stored in the formatted data queue 312. In the illustrated embodiment, the upper DWORD byte enables for the first QWORD are 0000 (active low) and are thus not partially active. Accordingly, the first QWORD 2222 2222 1111 1111 is temporarily stored in the formatted data queue 312 and control passes to the block 404 to evaluate the second QWORD.

In the block 404, the decoder 306 may determine whether the second QWORD byte enables are all active. When the decoder 306 sees a QWORD with byte enables that are not all active, control passes to a block 406. In the illustrated embodiment, the second QWORD byte enables are 1111 and 1100 (active low). Thus, in the example embodiment, the second QWORD byte enables are not all active and control passes to the block 406.

In the block 406, the decoder 306 may determine whether the second QWORD is the first data for the packet 320. If it is determined that the second QWORD is not the first data for the packet 320, then control passes to a block 420. In the illustrated embodiment, the second QWORD is the second data for the packet 320 and control passes to the block 420.

In the block 420, the decoder 306 may determine whether the upper DWORD byte enables for the second QWORD are all inactive. If the upper DWORD byte enables for the second QWORD are all inactive, control passes to a block 422. In the illustrated embodiment, the upper DWORD byte enables for the second QWORD are 1111 (active low) and control passes to the block 422.

In the block 422, the decoder 306 may send one or more control signals 316 to the data processing state machine 308 to break the second QWORD twice and the data processing state machine 308 may break the second QWORD twice in response to the control signal 316. In the illustrated embodiment, the data processing state machine 308 may break the second QWORD between the upper DWORD 4444 4444 and the lower DWORD 3333 3333. This may be because the upper DWORD 4444 4444 has the byte enables 1111, which are all inactive, and which are not combinable with the previous DWORD 3333 3333 which has the byte enables of 1100. The data processing state machine 308 may break the second QWORD at the end of the upper DWORD 4444 4444 because the upper DWORD 4444 4444, whose byte enables are 1111 (active low), is not combinable with the next DWORD 5555 5555, whose byte enables are 1100 (active low). In this embodiment, two PCI-Express packets are concluded when the decoder analyzes the second QWORD. The data processing state machine 308 may break "twice" and the command processing state machine 310 may generate command for the two PCI Express packets 320 that concluded. Block 422 may be consistent with the packet-based semantics of PCI Express protocol. Since that protocol defines byte enables for the first and last DWORDs in a transfer, everything in between the first and last DWORDs in a transfer have all bytes active.

Figure 5:
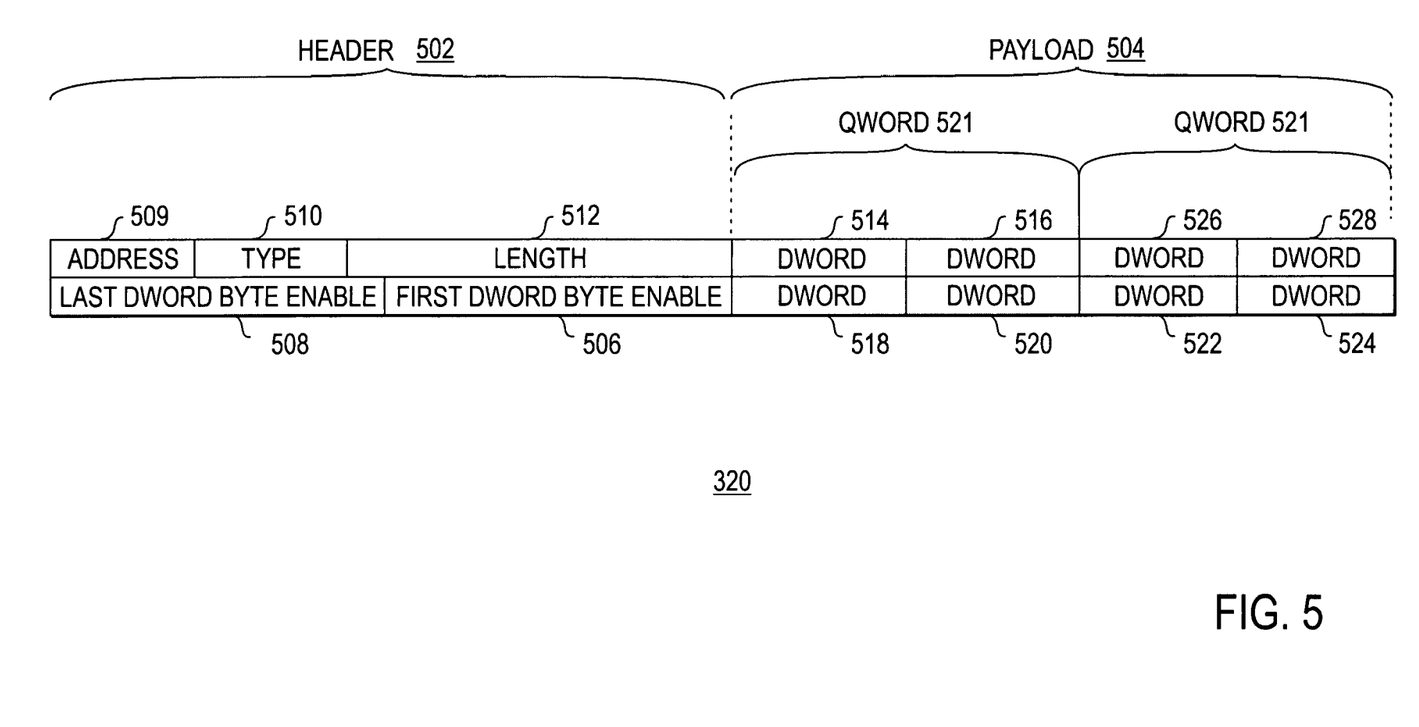
FIG. 5 is a diagram of fields of a PCI Express compliant packet.

In one embodiment, the DWORDS 3333 3333 2222 2222 1111 1111 may be temporarily stored in the formatted data queue 312 in a PCI Express packet format and the DWORDS 4444 4444 may be temporarily stored in the formatted data queue 312 in a PCI Express packet format. FIG. 5 is a diagram of an example PCI Express packet format (or PCI Express packet 320) according to an embodiment of the present invention. In the illustrated embodiment, the packet 320 includes a header 502 and a payload 504. The illustrated header 502 includes a field 506 for a first DWORD byte enables, a field 508 for a last DWORD byte enables, a field 509 for the start address in the I/O device 112, for example, a field 510 for the type of transaction, and a field 512 for the length of the data associate with the transaction. The example payload 504 includes four DWORDS 514, 516, 518, and 520, which make up one QWORD 521. The example payload 504 also includes four DWORDS 522, 524, 526, and 528, which make up one QWORD 530.

Figures 6, 7:
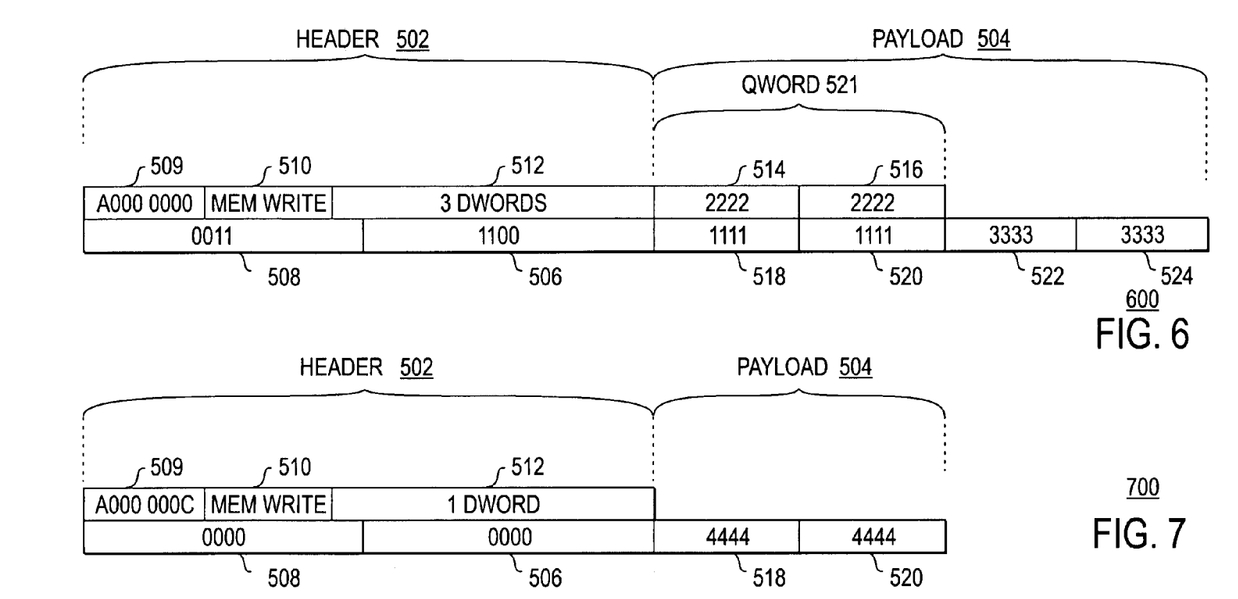
FIG. 6 is a diagram of a PCI Express compliant packet according to an embodiment of the present invention.
FIG. 7 is a diagram of a PCI Express compliant packet according to an alternative embodiment of the present invention.

FIG. 6 illustrates a PCI Express packet 600 having the DWORDS 3333 3333 2222 2222 1111 1111 according to an embodiment of the present invention. The field 506 may include 1100 (active high), the field 508 may include 0011 (active high), the field 509 may include the address A000 0000, the field 510 may include data to indicate that the command is a request to write to the I/O device 112, and the field 512 may include information to indicate that the length of the data is three DWORDS. The fields 514 and 516 may include the DWORD 2222 2222, the fields 518 and 520 may include the DWORD 1111 1111, and the fields 522 and 524 may include the DWORD 3333 3333. The formatted command queue 314 may forward this PCI Express packet 600 to the PCI Express interface 122.

FIG. 7 illustrates a PCI Express packet 700 having the DWORD 4444 4444 according to an embodiment of the present invention. The field 506 may include 0000 (active high), the field 508 may include 0000 (active high), the field 509 may include the address A000 000C, and the field 512 may include information to indicate that the length of the data is one DWORD. The fields 518 and 520 may include the DWORD 4444 4444. The formatted command queue 314 may forward this PCI Express packet 700 to the PCI Express interface 122. The address A000 0000 may increment to A000 000C because the three DWORDS 3333 3333 2222 2222 1111 1111 were written to the memory 114.

Returning back to FIG. 4, the process 400 continues for the third QWORD and in a block 406 the decoder 306 may determine whether the lower DWORD of the third QWORD is a first data for a packet 320. If it is determined that the lower DWORD of the third QWORD is a first data for a packet 320, control passes to a block 408. In the illustrated embodiment, the lower DWORD of the third QWORD, which is 5555 5555, is the first data for this PCI Express packet and control passes to the block 408.

In the block 408, the decoder 306 may determine whether the address for the upper DWORD of the third QWORD is QWORD aligned. In the illustrated embodiment, the lower three bits of the DWORD address are "000" and thus the address is QWORD aligned. Accordingly, control passes to the block 410.

In the block 410, the decoder 306 may determine whether the upper DWORD byte enables for the third QWORD are all inactive and if the upper DWORD byte enables are not all inactive, control passes to the block 412. In the illustrated embodiment, the upper DWORD byte enables are 0011 (active low). Accordingly, the upper DWORD byte enables for the third QWORD are all inactive and control passes to the block 412.

In the block 412, decoder 306 determines whether the lower DWORD byte enables for the third QWORD are contiguous with the previous DWORD byte enables. If the lower DWORD byte enables are not contiguous with the previous DWORD byte enables, then control passes to the block 414.

In the illustrated embodiment, because this is the first data for a PCI Express packet there is no previous DWORD, and control passes to the block 414.

In the block 414, the decoder 306 may determine whether the lower DWORD byte enables of the third QWORD are combinable with the next DWORD byte enables but not combinable with the previous DWORD byte enables. If this condition is not true, then control passes to the block 430. In the illustrated embodiment, the third QWORD has a byte enable of 0011 1100 (active low). The DWORD byte enable 1100 (active low) is not combinable with the next DWORD byte enable, which is the upper DWORD and has the byte enable 0011. The control will actually passes to 430 in. Accordingly, control passes to the block 430.

In the block 424, the decoder 306 may send one or more control signals 316 to the command processing state machine 310 to break the third QWORD once and the data processing state machine 308 may break the third QWORD once in response to the control signal 316. In the illustrated embodiment, the data processing state machine 308 may break the third QWORD at the end of the upper DWORD 6666 6666 because the upper DWORD 6666 6666 and the lower DWORD 5555 5555 have non-contiguous byte enables no further combining is possible. Both the command processing state machine 310 and the data processing state machine 308 may break once to conclude this as a PCI Express packet 320 . . .

Figure 8:
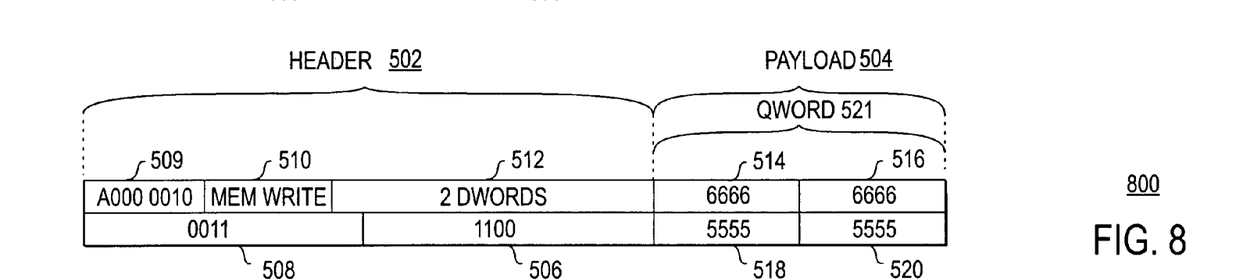
FIG. 8 is a diagram of a PCI Express compliant packet according to still another embodiment of the present invention.

In one embodiment, the DWORDS 6666 6666 5555 5555 may be temporarily stored in the formatted data queue 312 in a PCI Express packet format. FIG. 8 illustrates a PCI Express packet 800 for the first command having the DWORDS 6666 6666 5555 5555 according to an embodiment of the present invention.

The field 506 may include 1100 (active high), the field 508 may include 0011 (active high), the field 509 may include the address A000 0010, the field 510 may include data to indicate that the command is a request to write to the I/O device 112, and the field 512 may include information to indicate that the length of the data is two DWORDS. The fields 514 and 516 may include the DWORD 6666 6666 and the fields 518 and 520 may include the DWORD 5555 5555. The formatted command queue 314 may forward this PCI Express packet 800 to the PCI Express interface 122.

In one embodiment of the present invention, a QWORD's byte enables are not all active (block 404), the QWORD is the first QWORD of a PCI Express packet 320 (block 406), the address is QWORD aligned (block 408), some of the upper DWORD byte enables are active (block 410), and the lower DWORD is contiguous with the previous DWORD (block 412). In this embodiment, the decoder 306 may send one or more control signals 318 to the command processing state machine 310 to break the QWORD (block 424) and the command processing state machine 310 may break the QWORD at the end of the upper DWORD. The QWORD may be formed into a PCI Express packet and the formatted command queue 314 may forward this PCI Express packet to the PCI Express interface 122.

In one embodiment of the present invention, a QWORD's byte enables are not all active (block 404), the QWORD is the first QWORD of a PCI Express packet 320 (block 406), the address is not QWORD aligned (block 408), and the upper DWORD byte enables are not contiguous with the next DWORD byte enables (block 426). In this embodiment, the decoder 306 may send one or more control signals 318 to the command processing state machine 310 to break the QWORD (block 424) and the command processing state machine 310 may break the QWORD at the end of the upper DWORD.

In one embodiment of the present invention, a QWORD's byte enables are not all active (block 404), the QWORD is the first QWORD of a PCI Express packet 320 (block 406), the address is QWORD aligned (block 408), and all of the upper DWORD byte enables are inactive (block 410). In this embodiment, the decoder 306 may send one or more control signals 318 to the command processing state machine 310 to break the QWORD (block 422) and the command processing state machine 310 may break the QWORD at the end of the upper DWORD. As an example, suppose a QWORD has the following active low byte enables 1111 for the upper DWORD and 0101 for the lower DWORD. Suppose further that this QWORD is the first QWORD for a PCI Express packet. In this embodiment, the conversion module 120 may break the QWORD between the lower DWORD (byte enable 0101) and upper DWORD (byte enable 1111) because the upper and lower DWORD are not combinable and the end of the upper DWORD because the upper DWORD may not be combinable with the subsequent DWORD of data In one embodiment of the present invention, a QWORD's byte enables are not all active (block 404), the QWORD is the first QWORD of a PCI Express packet 320 (block 406), the address is not QWORD aligned (block 408), and the upper DWORD byte enables are contiguous with the next DWORD byte enables (block 426). In this embodiment, the QWORD may be forwarded to the formatted command queue 314 to wait for other DWORDS to be included in a PCI Express packet.

In one embodiment of the present invention, a QWORD's byte enables are not all active (block 404), the QWORD is not the first QWORD of a PCI Express packet. (block 406), the upper DWORD byte enables are not all inactive (block 420) the lower DWORD byte enables are combinable with the next DWORD byte enables (block 414), and the upper DWORD byte enables are not partially active (block 416). In this embodiment, the QWORD may be forwarded to the formatted command queue 314 to wait for other DWORDS to be included in a PCI Express packet 320.

In one embodiment of the present invention, a QWORD's byte enables are not all active (block 404), the QWORD is not the first QWORD of a PCI Express packet 320 (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is not met (block 430), the condition of the lower DWORD byte enables not being combinable with the previous DWORD byte enables or not being combinable with the next DWORD byte enables is not met (block 432), the lower DWORD byte enables are not all active (block 434), and the upper DWORD byte enables are combinable with the next DWORD byte enables. In this embodiment, the decoder 306 may send one or more control signals 318 to the command processing state machine 310 to break the QWORD (block 424) and the command processing state machine 310 may break the QWORD at the end of the upper DWORD (block 436).

In one embodiment of the present invention, a QWORD's byte enables are not all active (block 404), the QWORD is not the first QWORD of a PCI Express packet (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is met (block 430), and the upper DWORD byte enables are not combinable with the next DWORD byte enables (block 438). In this embodiment, the decoder 306 may send one or more control signals 318 to the command processing state machine 310 to break the QWORD (block 422) and the command processing state machine 310 may break the QWORD at the end of the upper DWORD.

In one embodiment of the present invention, a QWORD's byte enables are not all active (block 404), the QWORD is not the first QWORD of a PCI Express packet 320 (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is not met (block 430), the condition of the lower DWORD byte enables not being combinable with the previous DWORD byte enables or not being combinable with the next DWORD byte enables is not met (block 432), the lower DWORD byte enables are all active (block 434), and the condition that the upper DWORD byte enables are not combinable with the previous DWORD byte enables but not combinable with the next DWORD byte enables is met (block 440). In this embodiment, the decoder 306 may send one or more control signals 318 to the command processing state machine 310 to break the QWORD (block 422) and the command processing state machine 310 may break the QWORD at the end of the upper DWORD.

In one embodiment of the present invention, a QWORD's byte enables are not all active (block 404), the QWORD is not the first QWORD of a PCI Express packet 320 (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is not met (block 430), the condition of the lower DWORD byte enables not being combinable with the previous DWORD byte enables or not being combinable with the next DWORD byte enables is not met (block 432), the lower DWORD byte enables are all active (block 434), and the condition that the upper DWORD byte enables are not combinable with the previous DWORD byte enables but not combinable with the next DWORD byte enables is not met (block 440). In this embodiment, the decoder 306 may send one or more control signals 318 to the command processing state machine 310 to break the QWORD (block 424) and the command processing state machine 310 may break the QWORD at the end of the upper DWORD.

In one embodiment of the present invention, a QWORD's byte enables are not all active (block 404), the QWORD is not the first QWORD of a PCI Express packet 320 (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is met (block 430), and the upper DWORD byte enables are combinable with the next DWORD byte enables (block 438). In this embodiment, the decoder 306 may send one or more control signals 318 to the command processing state machine 310 to break the QWORD (block 424) and the command processing state machine 310 may break the QWORD at the end of the upper DWORD.

In one embodiment of the present invention, a QWORD's byte enables are not all active (block 404), the QWORD is not the first QWORD of a PCI Express packet 320 (block 406), the upper DWORD byte enables are not all inactive (block 420) the lower DWORD byte enables are not combinable with the next DWORD byte enables (block 414), the condition of the lower DWORD byte enables being combinable with the previous DWORD byte enables but not combinable with the next DWORD byte enables is not met (block 430), and the condition of the lower DWORD byte enables not being combinable with the previous DWORD byte enables or not being combinable with the next DWORD byte enables is met (block 432). In this embodiment, the decoder 306 may send one or more control signals 318 to the command processing state machine 310 to break the QWORD (block 424) and the command processing state machine 310 may break the QWORD at the end of the upper DWORD.

The example decoder 306 also may perform data path alignment of the PCI bus 106 data path, which may be a thirty-two-bit wide data path, with the PCI Express data path, which may be a sixty-four-bit wide data path. In this embodiment, the decoder 306 may perform a DWORD to QWORD conversion.

The operations of the process 400 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the process 400 is an example process and other processes may be used to implement embodiments of the present invention. A machine-accessible medium with machine-readable data thereon may be used to cause a machine, such as, for example, the processor 110, to perform the process 400.

A machine-accessible medium includes any mechanism that may be adapted to store and/or transmit information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.).

Figure 9:
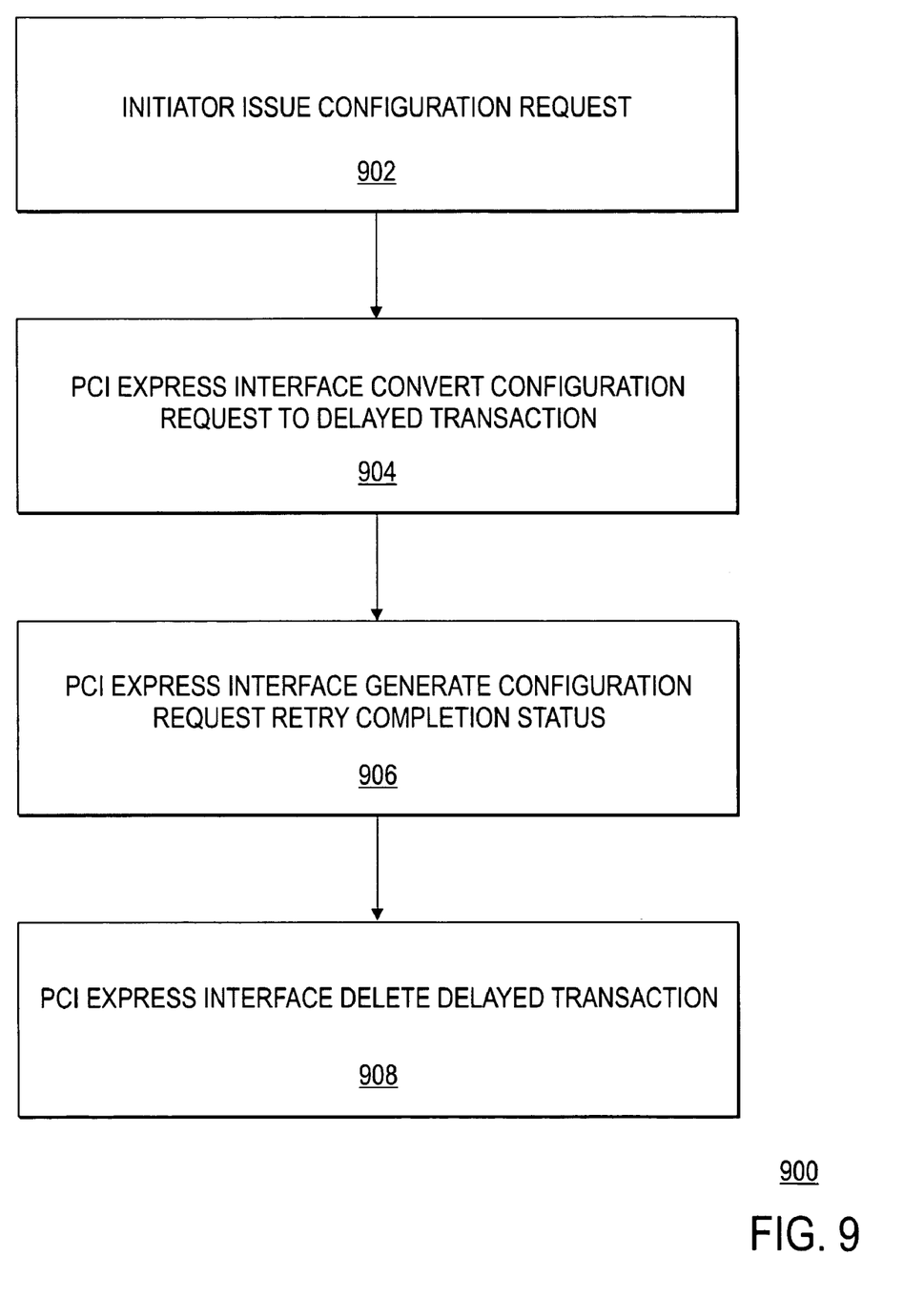
FIG. 9 is a flowchart illustrating a process of operating the computer system illustrated in FIG. 1 according to an alternative embodiment of the present invention.

An alternative embodiment of the present invention will now be described with reference to FIG. 9, which is a flowchart illustrating a process 900 for operating the computer system 100 according to an embodiment of the present invention, and with reference to a Configuration Request, a Configuration Request Retry Completion Status (CRS), and a Delayed Transaction. According to the PCI Specification and the PCI Express Specification, a Configuration Request is a request to access the configuration space of one of the I/O devices 112 (such as a configuration read or a configuration write, for example). According to PCI Express Specification, a Configuration Request Retry Completion Status (CRS) may be generated by a target to terminate a Configuration Request to stall the Configuration Request until the target or its intermediate support system is ready to communicate with the Configuration Request initiator. According to the PCI Specification, a Delayed Transaction is generated by targets that cannot complete an initial data phase within certain time limits.

In a block 902, an initiator, such as an I/O device 116 may issue a Configuration Request to a target, such as an I/O device 112.

In a block 904, the PCI Express interface 122 may convert the Configuration Request to a Delayed Transaction. In one embodiment, the PCI interface 126 handles the Configuration Request as Delayed Transaction and sends the Delayed Transaction to the PCI Express interface 122 via the decoder 306.

In a block 906, the PCI Express Interface 122 may generate a Configuration Request Retry Completion Status (CRS).

In a block 906, the PCI Express Interface 122 may delete the Delayed Transaction. In one embodiment, when Configuration Request Retry Completion Status (CRS) from PCI Express interface 122 is received at the PCI interface 126 the decoder 306 may delete the Delayed Transaction established internally.

The operations of the process 900 have been described as multiple discrete blocks performed in turn in a manner that may be most helpful in understanding embodiments of the invention. However, the order in which they are described should not be construed to imply that these operations are necessarily order dependent or that the operations be performed in the order in which the blocks are presented. Of course, the process 900 is an example process and other processes may be used to implement embodiments of the present invention. A machine-accessible medium with machine-readable data thereon may be used to cause a machine, such as, for example, the processor 110, to perform the process 900.

Embodiments of the present invention may be implemented using hardware, software, or a combination thereof. In implementations using software, such as the software 118, for example, the software may be stored on a machine-accessible medium.

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
   a first queue to receive an information stream having a peripheral component interconnect (PCI) bus protocol, the first queue to temporarily store the information stream in a quad word format;
   control logic to truncate the information stream in at least one location, the point of truncation to form a packet boundary; and
   a second queue to temporarily store the truncated information stream in a packet formatted according to a PCI Express format.

2. The apparatus of claim 1, wherein the control logic comprises a decoder to determine the location of the packet boundary using byte enables in the PCI bus protocol stream.

3. The apparatus of claim 2, wherein the control logic comprises at least one state machine to truncate the information temporarily stored in the first queue to form the packet boundary.

4. The apparatus of claim 3, wherein the at least one state machine is further to forward the truncated information to the second queue.

5. The apparatus of claim 1, wherein the first queue is a first-in-first-out buffer.

6. The apparatus of claim 5, wherein the second queue is a first-in-first-out buffer larger than the first queue.

7. The apparatus of claim 1, further comprising a PCI Express interface to receive the packet from the second queue.

8. The apparatus of claim 1, further comprising a PCI bus interface to forward the information stream having the PCI bus protocol to the first queue.

9. An apparatus, comprising:
   an input/output (I/O) controller having:
      a first buffer to receive a data stream having a peripheral component interconnect (PCI) bus protocol, wherein the data stream being in double word format and having byte enables, an individual double word having four byte enables associated therewith, the first buffer to temporarily store the data stream in a quad word format;
      circuitry to determine a packet boundary using byte enables in the data stream and to break the data stream to form the packet boundary; and
      a second queue to temporarily store the packet, the packet having a PCI Express format.

10. The apparatus of claim 9, wherein the I/O controller includes an arbiter to receive a request to use the I/O controller.

11. The apparatus of claim 10, wherein the arbiter is to grant the request to use the I/O controller.

12. The apparatus of claim 9, further comprising a memory controller coupled to the I/O controller.

13. A method, comprising:
   receiving data and associated byte enables from an agent, the data and associated byte enables having a PCI bus format;
   temporarily storing the data and associated byte enables having the PCI bus format in a first queue having a quad word format;
   decoding the byte enables temporarily stored in the first queue to determine whether at least some of byte enables are combinable, contiguous, and/or active; and
   transferring a quantity of data from the first queue to a second queue, the second queue having at least one location to temporarily store the quantity of data as a packet having a PCI express format, the quantity of data being transferred being determined by whether the at least some of the byte enables are combinable, contiguous, and/or active.

14. The method of claim 13, further comprising transferring the packet to a target.

15. The method of claim 13, further comprising receiving a configuration request from the agent.

16. The method of claim 15, further comprising converting the configuration request to a delayed transaction.

17. The method of claim 16, further comprising generating a configuration request retry status.

18. The method of claim 17, further comprising deleting the delayed transaction.

19. A system, comprising:
an input/output (I/O) controller having:
a first queue to receive information in a PCI bus protocol stream, the first queue to temporarily store the information in a quad word format;
control logic to truncate the information in at least one location in the stream; and
a second queue to temporarily store the truncated information, the second queue to temporarily store the truncated information in at least one packet formatted according to a PCI Express protocol; and
a synchronous random access memory (SDRAM) coupled to the input/output controller.

20. The system of claim 19, further comprising a PCI bus interface to forward the first information to the first queue.

21. The system of claim 20, further comprising a PCI Express interface to receive the second information from the second queue.

22. An article of manufacture, comprising:
a machine-accessible medium having associated data, wherein the data, when accessed, results in a machine performing:
receiving data and associated byte enables in a PCI information stream;
temporarily storing the data and associated byte enables in a first queue, the first queue having a quad word format;
decoding the byte enables to determine whether at least some of the byte enables are combinable, contiguous, and/or active;
breaking the PCI information stream based on whether the byte enables are combinable, contiguous, and/or active; and
temporarily storing the broken PCI information stream in a second queue, the broken PCI information stream being temporarily stored in a packet having a PCI express format.

23. The article of manufacture of claim 22, wherein the machine-accessible medium further includes data that, when accessed, results in the machine performing operations comprising transferring the packet to a PCI Express interface.

24. The article of manufacture of claim 23, wherein the machine-accessible medium further includes data that, when accessed, results in the machine performing operations, further comprising receiving a configuration request from the agent.

25. The article of manufacture of claim 24, wherein the machine-accessible medium further includes data that, when accessed, results in the machine performing operations, further comprising converting the configuration request to a delayed transaction.

26. The article of manufacture of claim 25, wherein the machine-accessible medium further includes data that, when accessed, results in the machine performing operations, further comprising generating a configuration request retry status.

27. The article of manufacture of claim 26, wherein the machine-accessible medium further includes data that, when accessed, results in the machine performing operations, further comprising deleting the delayed transaction.

* * * * *